US010061506B2

(12) United States Patent
Minami et al.

(10) Patent No.: US 10,061,506 B2
(45) Date of Patent: Aug. 28, 2018

(54) TOUCH DETERMINATION ON STACKED OR LAMINATED DISPLAY PANELS

(71) Applicant: CASIO COMPUTER CO., LTD., Shibuya-ku, Tokyo (JP)

(72) Inventors: Tsuyoshi Minami, Musashimurayama (JP); Kimiyasu Mizuno, Akishima (JP); Hideo Suzuki, Ome (JP); Takashi Suenaga, Tokyo (JP); Keiichi Nomura, Uenohara (JP); Shuhei Uchida, Hamura (JP); Munetaka Seo, Fussa (JP); Itsuki Yamashita, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 194 days.

(21) Appl. No.: 14/849,225

(22) Filed: Sep. 9, 2015

(65) Prior Publication Data
US 2016/0085362 A1 Mar. 24, 2016

(30) Foreign Application Priority Data

Sep. 22, 2014 (JP) ................................. 2014-192113
Jun. 25, 2015 (JP) ................................. 2015-127254

(51) Int. Cl.
*G06F 3/0488* (2013.01)
*G06F 1/16* (2006.01)

(52) U.S. Cl.
CPC ............ *G06F 3/0488* (2013.01); *G06F 1/163* (2013.01); *G06F 1/165* (2013.01)

(58) Field of Classification Search
CPC .... G06F 1/1637; G06F 1/1643; G06F 1/1647; G06F 1/1616; G06F 1/1624; G06F 1/1677; G06F 1/1662; G06F 2203/04803; G06F 2203/04804; G06F 3/04842; G06F 3/0485;
(Continued)

(56) References Cited

U.S. PATENT DOCUMENTS

2007/0103434 A1 * 5/2007 Lian ...................... G06F 3/1423
345/156
2008/0153452 A1 * 6/2008 Huang ................. H04B 1/3816
455/403
(Continued)

FOREIGN PATENT DOCUMENTS

JP 2004145821 A * 5/2004
JP 2013140158 A 7/2013
JP 2013222214 A 10/2013

OTHER PUBLICATIONS

English Language translation of JP 2013222214 A; Inventor: Takemura Kazunori; Publication date: Oct. 2013.*
(Continued)

*Primary Examiner* — Mrunalini Yerneni Mummalaneni
(74) *Attorney, Agent, or Firm* — Holtz, Holtz & Volek PC

(57) ABSTRACT

A display device includes a display, a touch panel and a controller. The display includes a plurality of display panels laminated on one another. The touch panel is provided on a screen of the display and accepts touch operation. The controller determines with respect to which display panel among the plurality of display panels the touch operation is carried out, and carries out a process corresponding to operation content of the touch operation on the determined display panel.

19 Claims, 5 Drawing Sheets

(58) Field of Classification Search
CPC ............... G06F 3/0486; G06F 3/0488; G09G 2300/023; G09G 2340/10
See application file for complete search history.

(56) References Cited

U.S. PATENT DOCUMENTS

| | | | | |
|---|---|---|---|---|
| 2008/0238828 | A1* | 10/2008 | Nakayama | G09F 9/35 345/76 |
| 2008/0309640 | A1* | 12/2008 | Hong | G06F 1/1616 345/173 |
| 2010/0156913 | A1* | 6/2010 | Ortega | G06F 3/1438 345/520 |
| 2012/0060089 | A1* | 3/2012 | Heo | G06F 1/1647 715/702 |
| 2012/0309465 | A1* | 12/2012 | Tani | G06F 1/1624 455/566 |
| 2013/0342512 | A1* | 12/2013 | Smith | G09G 3/3406 345/204 |
| 2014/0176454 | A1* | 6/2014 | Yu | G06F 3/0488 345/173 |

OTHER PUBLICATIONS

English Language translation of JP 2004145821 A; Inventor: Takigawa, Sadahiko; Publication date: May 2004.*
Japanese Office Action (and English translation thereof) dated Dec. 6, 2016 issued in counterpart Japanese pplication No. 2015-127254.

* cited by examiner

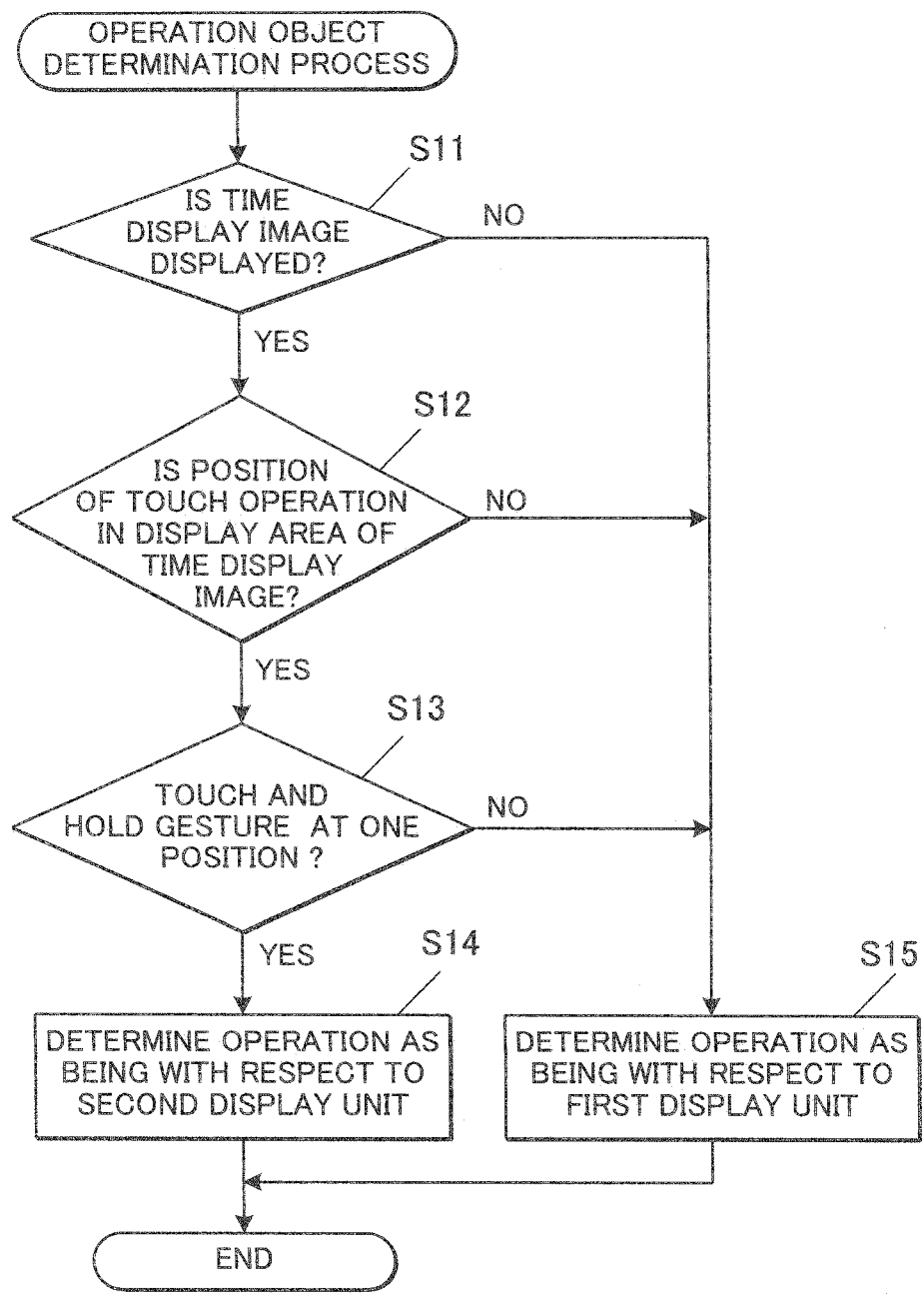

TOUCH DETERMINATION ON STACKED OR LAMINATED DISPLAY PANELS

CROSS-REFERENCE TO RELATED APPLICATIONS

This application is based upon and claims the benefit of priority under 35 USC 119 of Japanese Patent Application No. 2014-192113 filed on Sep. 22, 2014 and Japanese Patent Application No. 2015-127254 filed on Jun. 25, 2015 the entire disclosure of which, including the descriptions, claims, drawings, and abstracts, is incorporated herein by reference in its entirety.

BACKGROUND OF THE INVENTION

1. Field of the Invention

The present invention relates to a display device which displays a variety of information, and specifically relates to a display device including a touch panel, a method for controlling the same and a storage medium.

2. Description of the Related Art

In recent years, a variety of products have been developed and commercially sold which are worn by a human body to record and analyze a variety of data in daily life and in practicing exercise such as running, cycling, swimming and trekking. In addition, portable electronic devices such as portable phones, smartphones (highly functional portable phones) and tablets are also widely used. Such an electronic device includes a display device to provide a user with a variety of information and further includes a touch panel for receiving input operation.

For example, Japanese Patent Laid-Open Publication No. 2013-140158 discloses a so-called sport watch which is worn by a user and has a function to provide the user, by displaying on a display device, with a variety of data collected and analyzed while the user is practicing exercise.

Wearable or portable electronic devices in recent years such as the sport watch and smartphone described above include, for example, a sensor such as an accelerometer, a gyro sensor (angular velocity sensor) and a positioning sensor based on GPS (Global Positioning System) and a variety of data communication functions.

These sensors and communication functions are set so as to always operate when an electronic device is carried around or used. A variety of information obtained by these sensors and communication functions is provided to a user when required through a display device in various displaying styles. Thereby, a user can easily know his/her condition in practicing exercise and moving path.

Some of the wearable or portable electronic devices described above each include a liquid crystal display composed of two layers as disclosed in Japanese Patent Laid-Open Publication No. 2004-145821 to provide a user with information as required on a small display in various displaying styles.

SUMMARY OF INVENTION

Problem to be Solved by the Invention

An object of the present invention is to provide a display device including a touch panel which properly determines what operation is given.

Means for Solving the Problem

According to a first aspect of the present invention, there is provided a display device including a display including a plurality of display panels laminated on one another; a touch panel which is provided on a screen of the display and accepts touch operation; and a controller, wherein the controller determines with respect to which display panel among the plurality of display panels the touch operation is carried out, and carries out a process corresponding to operation content of the touch operation on the determined display panel.

According to a second aspect of the present invention, there is provided a method for controlling a display device including a display including a plurality of display panels laminated on one another and a touch panel provided on a screen of the display including determining with respect to which display panel among the plurality of display panels touch operation on the touch panel is carried out; and carrying out a process corresponding to operation content of the touch operation on the determined display panel.

According to a third aspect of the present invention, there is provided a non-transitory storage medium for storing a program to cause a computer of a display device including a display including a plurality of display panels laminated on one another and a touch panel which is provided on a screen of the display and accepts touch operation to function as units including a determination unit which determines with respect to which display panel among the plurality of display panels the touch operation is carried out; and a processing unit which carries out a process corresponding to operation content of the touch operation with respect to the display panel determined by the determination unit.

BRIEF DESCRIPTION OF THE DRAWINGS

The present invention is fully understood form the detailed description given hereafter and the accompanying drawings, which are given by way of illustration only and thus are not intended to limit the present invention, wherein:

FIG. 4 is a flow chart showing an example of operation in connection with an operation object determination process in the displayed content modification process shown in FIG. 3;

DETAILED DESCRIPTION OF THE PREFERRED EMBODIMENTS

Embodiments of the present invention will now be described with reference to the accompanying drawings. The scope of the present invention should not be limited to the illustrated examples.

Figure 1:
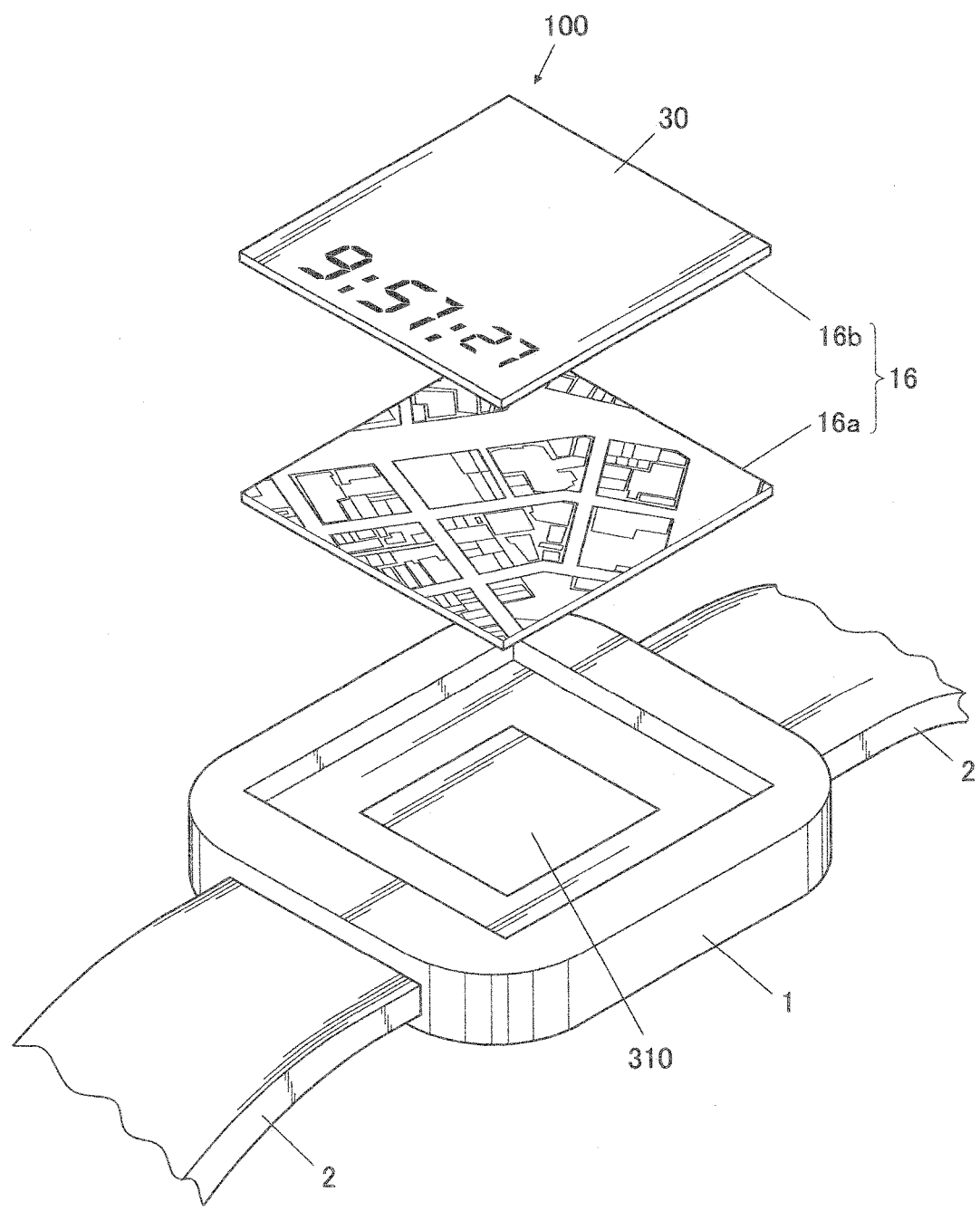
FIG. 1 is a schematic view showing a wearable terminal device according to an embodiment of the present invention.

FIG. 1 is a schematic view showing a wearable terminal device 100 according to an embodiment of a display device of the present invention.

As shown in FIG. 1, the wearable terminal device 100 according to the present embodiment has a form of a wristwatch and includes a main body unit 1 and a band unit 2. The wearable terminal device 100 includes a display unit 16 in the main body unit 1.

The display unit 16 includes a first display unit 16a and a second display unit 16b. Specifically, the display unit 16 is formed such that the second display unit 16b is laminated on the first display unit 16a. Thus, the display unit 16 can display a displayed image (e.g., clock display) of the second display unit 16b superimposed on a displayed image (e.g., map display) of the first display unit 16a.

The wearable terminal device 100 includes a touch panel 30 constituting an operation unit 19 (described in the following) on a glass substrate of the second display unit 16b.

The touch panel 30 is, for example, a capacitive touch panel and is formed by ITO (Indium Tin Oxide) vapor-deposited on the glass substrate of the second display unit 16b.

The wearable terminal device 100 includes a backlight 310.

The backlight 310 is disposed on the back side of the first display unit 16a (side opposite to a user's view side), for example. A surface light source employing a plurality of LEDs (Light Emitting Devices) and a variety of optical members such as a light guide plate and a light diffusion film is applied. as the backlight 310.

In the wearable terminal device 100, the display brightness of the first display unit 16a or the second display unit 16b is controlled in accordance with the luminescence brightness of the backlight 310. The backlight 310 is unnecessary to be configured so as to be disposed on the back side of the first display unit 16a and may be configured so as to be disposed on the user' s view side of the first display unit 16a to serve as a front light.

Figure 2:
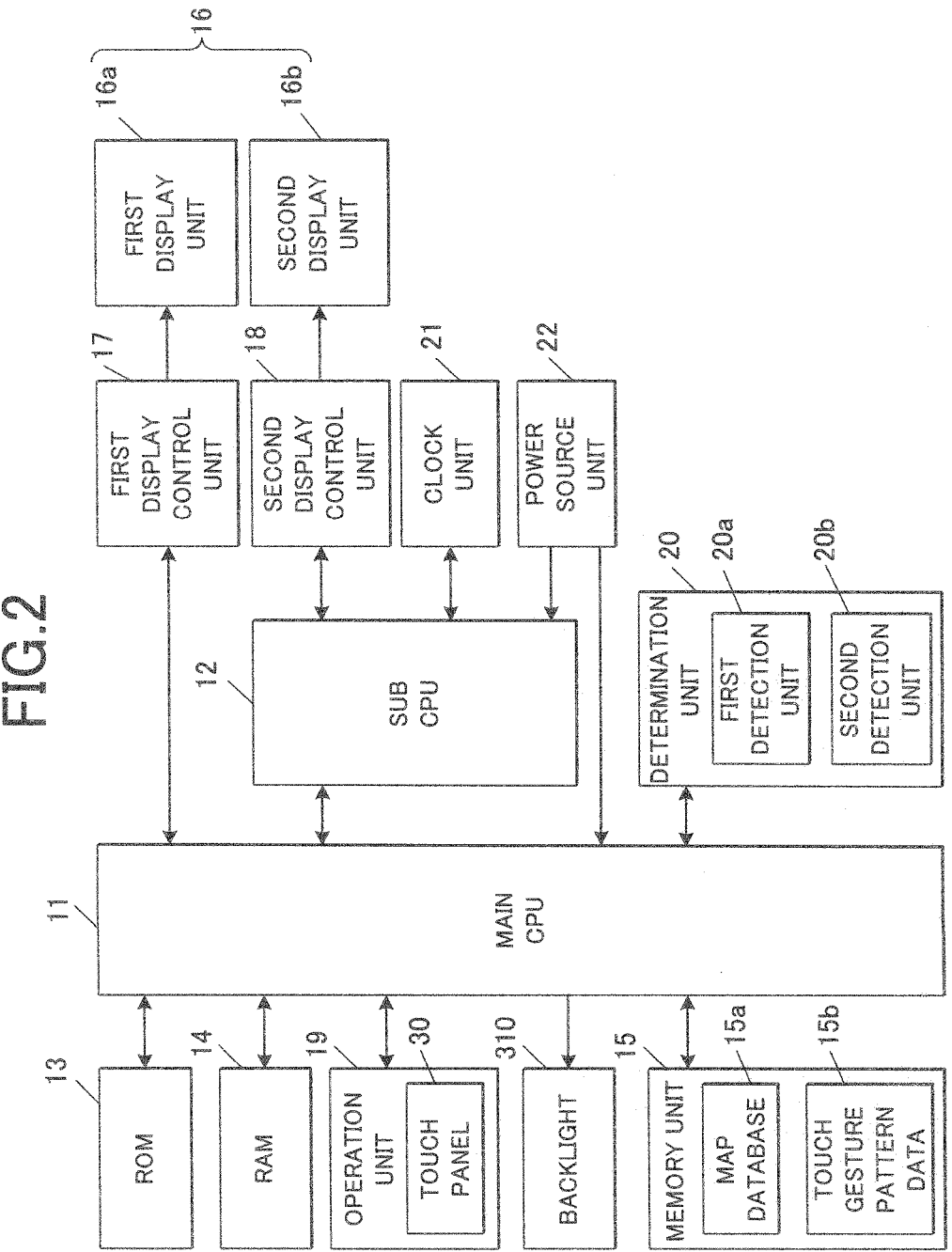
FIG. 2 is a block diagram showing a schematic configuration of the wearable terminal device according to an embodiment of the present invention.

FIG. 2 is a block diagram showing a schematic configuration of the wearable terminal device 100 according to the present embodiment.

As shown in FIG. 2, the wearable terminal device 100 includes a main CPU (Central Processing Unit) (controller) 11 and a sub CPU (controller) 12 which serve as controllers for controlling the device as a whole, a ROM (Read Only Memory) 13, a RAM (Random Access Memory) 14, a storage unit 15, the display unit 16 (the first display unit 16a and the second display unit 16b), a first display control unit 17 which controls the displaying of the first display unit 16a, a second display control unit 18 which controls the displaying of the second display unit 16b, the operation unit 19, a determination unit (controller) 20, a clock unit 21, a power source unit 22 and the like.

The main CPU 11 carries out a variety of computational processing and controls entire operation of the wearable terminal device 100 as a whole. In the present embodiment, the main CPU 11 carries out processing relating to a variety of operation enabling executable functions such as display control commands on the first display control unit 17. The main CPU 11 carries out the control of displaying of the first display unit 16a through the first display control unit 17.

The sub CPU 12 carries out processing relating to a variety of operation enabling executable functions such as display control commands on the second display control unit 18. The sub CPU 12 carries out the control of displaying of the second display unit 16b through the second display control unit 18.

The ROM 13 stores a variety of programs to be executed by the main CPU 11 and/or the sub CPU 12 and initial setting data.

The RAM 14 provides the main CPU 11 and the sub CPU 12 with working area and stores temporary data for working.

The storage unit (memory) 15 is a readable and writable non-volatile memory such as a flash memory and an EEPROM (Electrically Erasable and Programmable Read Only Memory) The storage unit 15 stores a map database 15a and touch gesture pattern data 15b, for example.

The map database 15a includes, as shown in FIG. 5A to FIG. 5D, for example, map data to display a map image M of a predetermined area on the first display unit 16a (such as administrative districts such as prefectures and municipalities, address information such as house numbers, information on buildings, facilities, shops, parks, railroads etc., topographical information, road map information).

The touch gesture pattern data 15b includes touch gesture patterns specific to and associated with each of the first display unit 16a and the second display unit 16b.

Specifically, the touch gesture pattern data 15b includes, as touch gesture patterns specific to the first display unit 16a, for example, multi-touch gestures with which touch operation is carried out at a plurality of points. The touch gesture pattern data 15b also includes, as touch gesture patterns specific to the second display unit 16b, touch and hold gestures (which lasts at least a predetermined duration of time, for example, two-second hold) at one position (position of touch operation.

As described above, the display unit 16 includes the first display unit 16a and the second display unit 16b.

The first display unit 16a is composed of a TFT color liquid crystal panel with the backlight, and displays on a screen a variety of information under control of the first display control unit 17 described in the following.

The first display control unit 17 generates display data and carries out control for the first display unit 16a to display on the screen thereof the generated display data.

In the present embodiment, for example, in accordance with the display command(s) from the main CPU 11, the first display control unit 17 generates the display data of the map image M based on map data stored in the map database 15a, and outputs the generated display data from the first display unit 16a. In this case, the main CPU 11 receives an operation signal(s) in accordance with predetermined touch operation with respect to the first display unit 16a and outputs the display command(s).

The second display unit 16b is composed of a PN (Polymer Network) liquid crystal panel which can partially or entirely transmit light, and displays on the screen thereof a variety of information under control of the second display control unit 18 described in the following.

In the present embodiment, as shown in FIG. 1, the PN liquid crystal panel serving as the second display unit 16b is laminated onto the TFT color liquid crystal panel serving as the first display unit 16a described above.

In the PN liquid crystal panel, a part where no voltage is applied reflects light because liquid crystal molecules are randomly oriented in such apart. Namely, the PN liquid crystal panel displays an image(s) at the part where no voltage is applied. In contrast, a part where voltage is applied can transmit light because the liquid crystal molecules are oriented perpendicularly to the screen.

Namely, since the part where voltage is applied become able to transmit light from the TFT color liquid crystal panel described above, the image(s) displayed by the TFT color liquid crystal panel can be seen through the PN liquid crystal panel.

Namely, the display unit 16 of the present embodiment can display images respectively displayed by the first display unit 16a and the second display unit 16b such that the image(s) displayed by the second display unit 16b is superimposed on the image(s) displayed by the first display unit 16a.

Figure 5A:
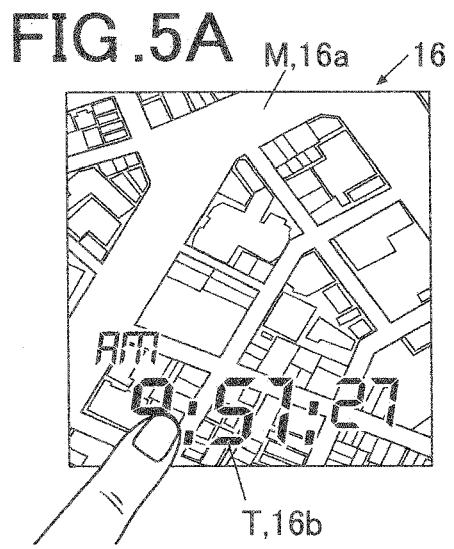
FIG. 5A shows an example of touch operation with respect to a display unit.
Figure 5B:
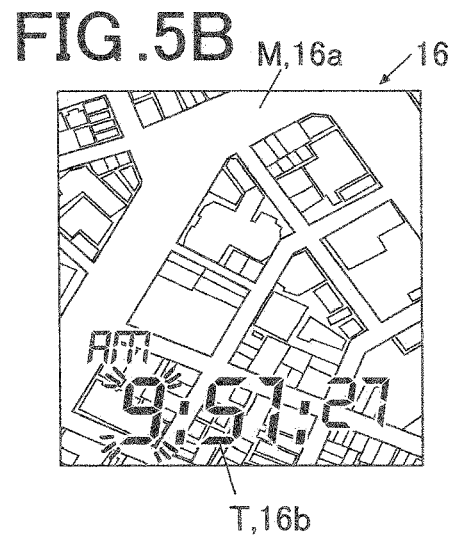
FIG. 5B shows an example of touch operation with respect to the display unit.
Figure 5C:
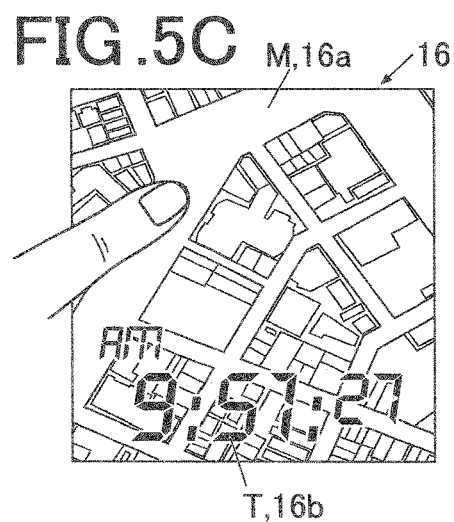
FIG. 5C shows an example of touch operation with respect to the display unit.
Figure 5D:
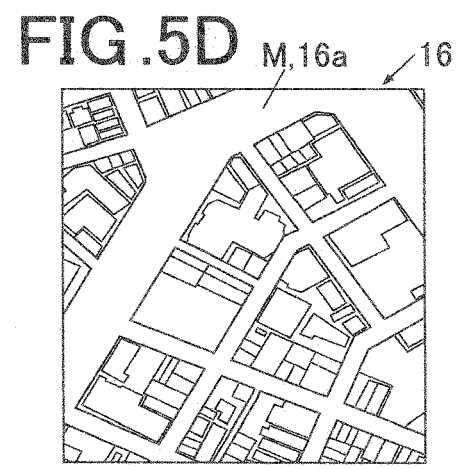
FIG. 5D shows an example of touch. operation with respect to the display unit.
Figure 5E:
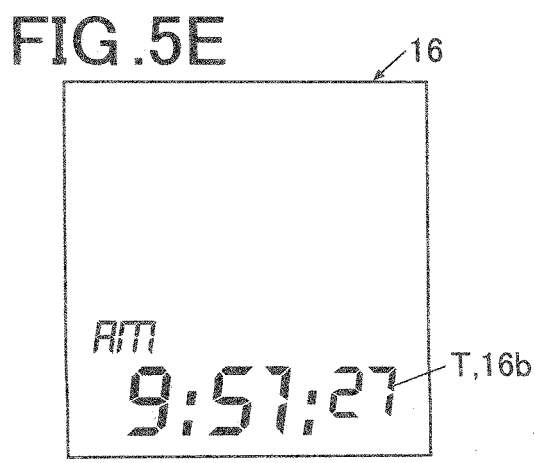
FIG. 5E shows an example of a displayed image shown on the display unit.

Since the PN liquid crystal panel serving as the second display unit 16b consumes a small amount of power, usually the second display unit 16b displays a time display image and the TFT color liquid crystal panel serving as the first display unit 16a does not display an image (refer to FIG. 5E). In addition, in the present embodiment, when the wearable terminal device 100 is left unattended without being used (for example, when it is determined that no operation has been carried out on the operation unit 19 (touch panel 30) for a predetermined duration of time, the wearable terminal device 100 is transferred to a light off state where the backlight, the first display unit 16a and the second display unit 16b are turned off and least power is consumed, namely to a state where neither the first display unit 16a nor the second display unit 16b displays an image. When it is determined that operation is carried out on the operation unit 19 (touch panel 30) in the light off state, the wearable terminal device 100 is transferred to, for example, a state where only the second display unit 16b displays a variety of information. The wearable terminal device 100 may be configured such that, when it is determined that operation is carried out on the operation unit 19 (touch panel 30) in the light off state, the wearable terminal device 100 is transferred to a state where only the first display unit 16a displays a variety of information or both the first display unit 16a and the second display unit 16b display a variety of information. In a case where the wearable terminal device 100 includes a gyro sensor, the wearable terminal device 100 may be configured such that, when the gyro sensor detects movement of an arm in the light off state, for example, the wearable terminal device 100 is transferred to a state where only the first display unit 16a displays a variety of information, a state where only the second display unit 16b displays a variety of information or a state where both the first display unit 16a and the second display unit 16b display a variety of information.

The second display control unit 18 generates display data and carries out control for the second display unit 16b to display on the screen thereof the generated display data.

In the present embodiment, for example, in accordance with the display command(s) from the sub CPU 12, the second display control unit 18 generates the display data of time display image T based on time information obtained from the clock unit 21, and outputs the generated display data. In this case, the sub CPU 12 receives an operation signal(s) in accordance with predetermined touch operation with respect to the second display unit 16b and outputs the display command(s).

The operation unit 19 includes a capacitive touch panel 30 described above which is provided on the screen of the second display unit 16b. The operation unit 19 detects a position(s) and content of a user's touch operation on the touch panel 30, generates a signal(s) in accordance with the touch operation and outputs the signal(s) to the main CPU 11 as an input signal(s).

The determination unit 20 determines with respect to which of the first display unit 16a and the second display unit 16b the touch operation is carried out, based on at least one of a displaying feature on the first display unit 16a and the second display unit 16b and the feature of the touch operation when the touch operation is carried out on the operation unit 19.

Specifically, the determination unit 20 includes a first detection unit 20a and a second detection unit 20b.

The first detection unit 20a detects a display area(s) of information displayed on each of the first display unit 16a and the second display unit 16b.

Specifically, for example, when the first display control unit 17 outputs a signal(s) relating to colors and/or brightness of a dot matrix of the TFT color liquid crystal panel serving as the first display unit 16a, the first detection unit 20a detects the display area(s) of the information displayed on the first display unit 16a based on the output signal(s). When the second display control unit 18 outputs a signal(s) for applying voltage of a dot matrix of the PN liquid crystal panel serving as the second display unit 16b, the first detection unit 20a detects the display area(s) of the information displayed on the second display unit 16b based on the output signal(s).

The second detection unit 20b detects a position of touch operation when the touch operation is carried out on the operation unit 19.

Specifically, for example, the second detection unit 20b detects the position of the touch operation based on the operation signal(s) input from the operation unit 19 in accordance with the touch operation.

In the present embodiment, the determination unit 20 determines with respect to which of the first display unit 16a and the second display unit 16b the touch operation on the operation unit 19 is carried out, based on conditions detected by the first detection unit 20a and the second detection unit 20b described above.

Specifically, for example, when the touch operation is carried out on the operation unit 19, if the time display image T is not displayed on the second display unit 16b, the determination unit 20 determines that the touch operation is carried out with respect to the first display unit 16a irrespective of the position of the touch operation detected by the second detection unit 20b.

As shown in FIG. 5A and 5C, when the touch operation is carried out on the operation unit 19, if the time display image T is displayed on the second display unit 16b, namely if the time display image T is displayed so as to be superimposed on the image displayed on the first display unit 16a (for example, the map image M), the determination unit 20 determines if the position of the touch operation detected by the second detection unit 20b is in the area of the time display image T on the first display unit 16a detected by the first detection unit 20a.

As shown in FIG. 5C, if it is determined that the position of the touch operation is not located in the area of the time display image T, the determination unit 20 determines that the touch operation is carried out with respect to the first display unit 16a. On the other hand, as shown in FIG. 5A, if it is determined that the position of the touch operation is located in the area of the time display image T, the determination unit 20 further determines if the feature of the touch operation matches a touch gesture pattern stored in the touch gesture pattern data 15b.

If it is determined that the feature of the touch operation matches a touch and hold gesture which lasts at least a predetermined duration of time at one position, the determination unit 20 determines that the touch operation is carried out with respect to the second display unit 16b associated with the touch and hold gesture. If it is determined that the touch operation on the operation unit 19 is carried out with respect to the second display unit 16*b*, the operation signal(s) in accordance with the touch operation is output to the sub CPU 12 through the main CPU 11.

On the other hand, if it is determined that the feature of the touch operation matches a multi-touch gesture, the determination unit 20 determines that the touch operation is carried out with respect to the first display unit 16*a* associated with the multi-touch gesture.

In the present embodiment, if the feature of the touch operation does not match any touch gesture pattern stored in the touch gesture pattern data 15*b*, the determination unit 20 determines that the touch operation is carried out with respect to the first display unit 16*a*.

The clock unit 21 (not shown) is configured to include, for example, a timer and/or a clock circuit, and checks the current time to obtain the time information. The clock unit 21 outputs the obtained time information to the sub CPU 12.

The power source unit 22 supplies power with predetermined voltage for the operation of the wearable terminal device 100. The power source unit 22 includes, for example, a battery selected from batteries with a variety of mechanisms (a lithium battery, a nickel-hydrogen storage cell, etc.). In the present embodiment, the power source unit 22 supplies power to the main CPU 11 and the sub CPU 12.

In FIG. 2, the determination unit 20 including the first detection unit 20*a* and the second detection unit 20*b* is shown as an independent element. However, the determination unit 20 may be included in the main CPU 11 as a part of the main CPU 11. The main CPU 11 and the sub CPU 12 are configured as separate dual processors. However, the functions of the main CPU 11 and the sub CPU 12 can be realized by a single CPU. Alternatively, the main CPU 11 and the sub CPU 12 may be configured as a single dual CPU including two processor cores in a single semiconductor package.

Furthermore, the first display control unit 17 may be included in the main CPU 11 as a part of the main CPU 11. Each of the second display control unit 18 and the clock unit 21 may be included in the sub CPU 12 as a part of the sub CPU 12.

<Displayed Content Modification Process>

A displayed content modification process on the display unit 16 carried out by the wearable terminal device 100 of the present embodiment will be explained with reference to FIG. 3.

Figure 3:
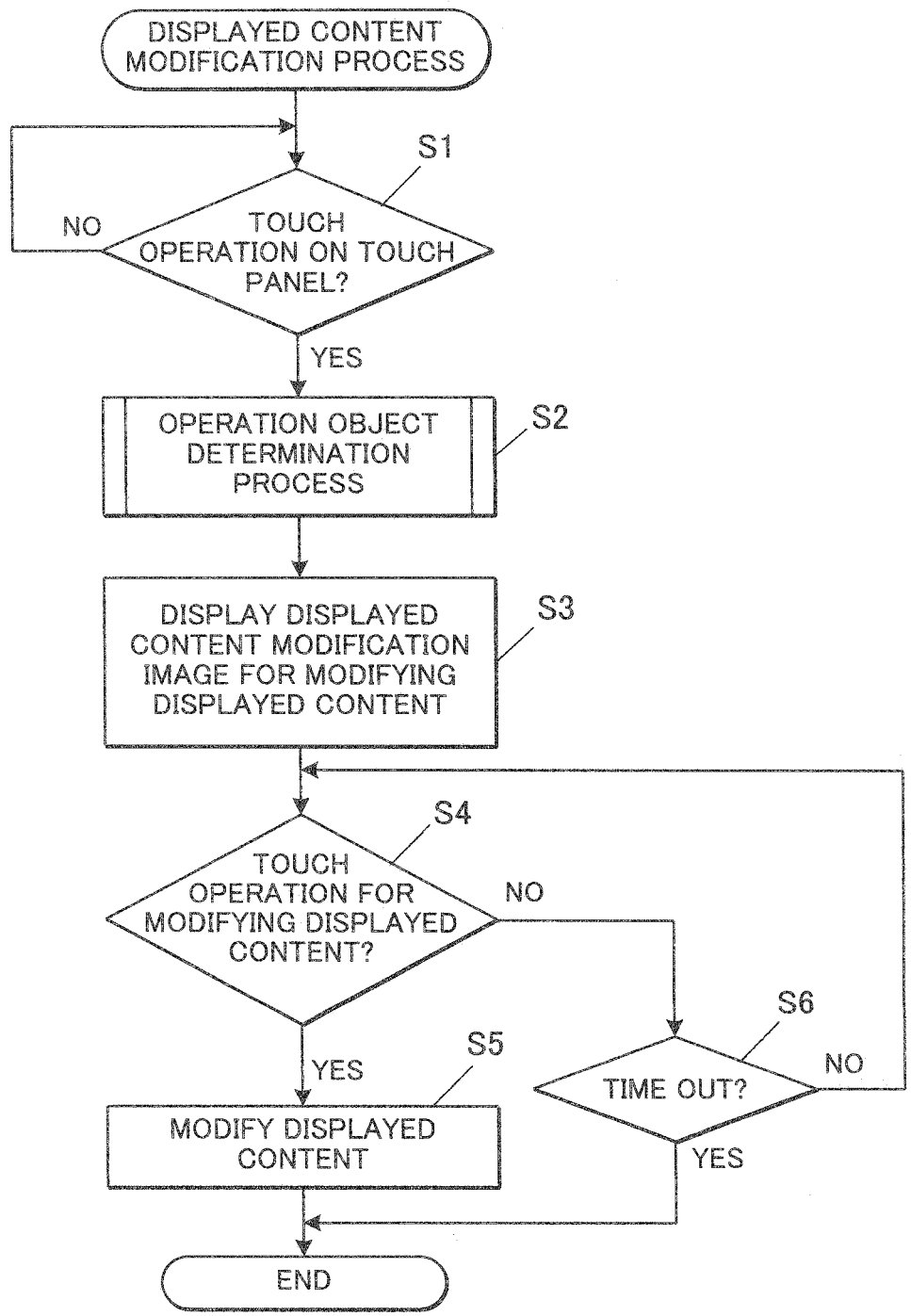
FIG. 3 is a flow chart showing an example of operation in connection with a displayed content modification process by the wearable terminal device shown in FIG. 1.

FIG. 3 is a flow chart showing an example of operation in connection with the displayed content modification process.

As shown in FIG. 3, the main CPU 11 first determines if touch operation is carried out on the operation unit 19 (touch panel 30) (Step S1). The determination process in Step 1 is carried out repeatedly until it is determined that touch operation is carried out on the operation unit 19 (Step S1; YES).

If it is determined that the touch operation is carried out on the operation unit 19 in Step S1 (Step S1; YES), the determination unit 20 carries out an operation object determination process (Step S2). The operation object determination process will be explained in detail in the following.

In accordance with a result of the operation object determination process (Step S2), the first display control unit 17 or the second display control unit 18 causes the corresponding display unit (the first display unit 16*a* or the second display unit 16*b*) to display a displayed content modification image for modifying displayed content on the corresponding display unit (Step S3).

Specifically, for example, if it is determined that touch operation on the operation unit 19 is carried out with respect to the map image M on the first display unit 16*a* (refer to FIG. 5C) in the operation object determination process (Step S2), in order to make it easier to modify the displayed map image M of the first display unit 16*a*, the second display control unit 18 hides the time display image T displayed on the second display unit 16*b* whereby only the map image M is displayed (refer to FIG. 5D) (displayed content modification image) such that the operation unit 19 accepts operation for enlarging or reducing the map image M.

On the other hand, if it is determined that touch operation on the operation unit 19 is carried out with respect to the time display image T (for example, an "hour" area among "hour", "minute" and "second" areas) on the second display unit 16*b* (refer to FIG. 5A), the second display control unit 18 switches the displayed image of an "hour" indication to a blink indication (displayed content modification image) such that the operation unit 19 accepts operation for time setting.

The main CPU 11 determines if touch operation for modifying the displayed content is carried out (Step S4).

If it is determined that touch operation for modifying the displayed content is carried out in Step S4 (Step S4; YES), the first display control unit 17 or the second display control unit 18 modifies the displayed content of the corresponding display unit (the first display unit 16*a* or the second display unit 16*b*) in accordance with the touch operation and ends the displayed content modification process.

Specifically, as shown in FIG. 5B, when the "hour" indication displayed on the second display unit 16*b* is set to the blink indication, if scrolling operation to trace the "hour" indication downward on the screen is carried out, for example, it is determined that operation for setting time is carried out, and the "hour" indication of "9" can be changed to "8", "7" . . .

If it is determined that touch operation for modifying the displayed content is not carried out in Step S4 (Step S4; NO), the main CPU 11 determines if predetermined time (time-out period) has elapsed since the displayed content modification image for modifying the displayed content on the first display unit 16*a* or the second display unit 16*b* started to be displayed (Step S6).

If it is determined that the time-out period has not elapsed in Step S6 (Step S6; NO), the flow returns to Step S4. On the other hand, if it is determined that the time-out period has elapsed (Step S6; YES), the displayed content modification process is ended.

<Operation Object Determination Process>

The operation object determination process will be described in detail with reference to FIG. 4.

FIG. 4 is a flow chart showing an example of operation in connection with the operation object determination process.

As shown in FIG. 4, the determination unit 20 first determines if the time display image T is displayed on the second display unit 16*b* based on the display control by the second display control unit 18 (Step S11).

If it is determined that the time display image T is displayed on the second display unit 16*b* in Step S11 (Step S11; YES), the determination unit 20 determines if the position of touch operation detected by the second detection unit 20*b* is located in the display area(s) of the time display image T of the second display unit 16*b* detected by the first detection unit 20*a* (Step S12).

If it is determined that the position of the touch operation detected by the second detection unit 20*b* is located in the display area(s) of the time display image T of the second display unit 16b detected by the first detection unit 20a (Step S12; YES), the determination unit 20 further determines if the feature of the touch operation matches a touch gesture pattern stored in the touch gesture pattern data 15b, specifically the determination unit 20 determines if the feature of the touch operation matches a touch and hold gesture at one position (Step S13).

If it is determined that the feature of the touch operation matches a touch and hold gesture at one position in Step S13 (Step S13; YES), the determination unit 20 determines that the touch operation is carried out with respect to the second display unit 16b (Step S14) and ends the operation object determination process.

If it is determined that the time display image T is not displayed on the second display unit 16b in Step S11 (Step 511; NO), if the position of the touch operation detected by the second detection unit 20b is not located in the display area(s) of the time display image T of the second display unit 16b detected by the first detection area 20a in Step S12 (Step 512; NO), or if the feature of the touch operation does not match a touch and hold gesture at one position in Step S13 (Step S13; NO), the determination unit 20 determines that the touch operation is carried out with respect to the first display unit 16a (Step S15) and ends the operation object determination process.

As described above, according to the wearable terminal device 100 of the present embodiment, when the touch operation is carried out on the operation unit 19, the determination unit 20 determines with respect to which of the first display unit 16a and the second display unit 16b the touch operation is carried out, based on at least one of the displaying feature on the display unit 16 and the feature of the touch operation.

Therefore, even when it is difficult to determine with respect to which of the first display unit 16a and the second display unit 16b the touch operation on the operation unit 19 is carried out, it is possible to properly determine with respect to which of the first display unit 16a and the second display unit 16b the touch operation is carried out by taking into consideration the displaying feature of the display unit 16 and the feature of the touch operation when the touch operation is carried out.

Furthermore, according to the wearable terminal device 100 of the present embodiment, since it is not necessary to provide a switch for selecting and determining with respect to which of the first display unit 16a and the second display unit 16b the operation is carried out, and it is not necessary to put effort into switching to, for example, a specific mode to carry out the operation, it is possible to easily determine with respect to which of the first display unit 16a and the second display unit 16b the touch operation is carried out only by carrying out predetermined touch operation on the operation unit 19.

Further, the wearable terminal device 100 of the present embodiment includes the first detection unit 20a which detects the display area(s) of the information displayed on each of the first display unit 16a and the second display unit 16b, and the second detection unit 20b which detects the position of operation when touch operation is carried out on the operation unit 19. The determination unit 20 determines with respect to which of the first display unit 16a and the second display unit 16b the touch operation is carried out, based on the display area detected by the first detection unit 20a and the position of operation detected by the second detection unit 20b.

Specifically, since it is determined that the touch operation is carried out with respect to the display unit which displays information in a display area when the second detection unit 20b detects the position of operation in the display area(s) detected by the first detection unit 20a, it is possible to accurately determine with respect to which of the first display unit 16a and the second display unit 16b the touch operation is carried out.

According to the wearable terminal device 100 of the present embodiment, when there is an area(s) where each of the display area(s) detected by the first detection unit 20a are overlapped with each other, if touch operation is carried out on the overlapped area(s), it is determined that the touch operation is carried out on the display unit associated with the touch gesture pattern of the touch operation.

Thus, even when it is difficult to determine with respect to which of the first display unit 16a and the second display unit 16b the touch operation on the operation unit 19 is carried out, it is possible to properly determine with respect to which of the first display unit 16a and the second display unit 16b the touch operation is carried out by taking into consideration the displaying feature of the display unit 16 and the touch gesture pattern of the touch operation when the touch operation is carried out.

<Modification>

A wearable terminal device 100T according to a modification of the present invention will now be explained. The wearable terminal device 100T according to the modification includes structures substantially equivalent to those of the wearable terminal device 100 according to the embodiment described above, and thus, in the following explanation, the equivalent structures are denoted by the same reference numerals.

According to the embodiment described above, the wearable terminal device 100 has four displaying features defined at each position on the screen of the display unit 16; (1) a case where only the first display unit 16a displays a variety of information, (2) a case where only the second display unit 16b displays a variety of information, (3) a case where both the first display unit 16a and the second display unit 16b display a variety of information; and (4) a case where neither the first display unit 16a nor the second display unit 16b displays information (the case of the light off state)

In contrast, in the wearable terminal device 100T according to the modification, the first display unit 16a and the second display unit 16b can operate in a mutually exclusive manner. Namely, when one of the first display unit 16a and the second display unit 16b displays information, the other does not display information.

While one of the first display unit 16a and the second display unit 16b is displaying information, the other is in a sleep mode and starts operation thereof upon detection of a predetermined trigger such as touch operation on the touch panel 30.

In this modification, the determination unit 20 determines, under control of the main CPU 11, with respect to which of the first display unit 16a and the second display unit 16b the touch operation on the operation unit 19 (touch panel 30) is carried out, based on which of the first display unit 16a and the second display unit 16b displays an image. For example, while the first display unit 16a displays an image, the determination unit 20 determines that the touch operation on the operation unit 19 (touch panel 30) is carried out with respect to the first display unit 16a. On the other hand, while the second display unit 16b displays an image, the determination unit 20 determines that the touch operation on the operation unit 19 (touch panel 30) is carried out with respect to the second display unit 16b.

As described above, according to the wearable terminal device 100T of the present modification, since it is determined, under control of the main CPU 11, with respect to which of the first display unit 16a and the second display unit 16b the touch operation on the operation unit 19 (touch panel 30) is carried out, based on which of the first display unit 16a and the second display unit 16b displays an image, it can be easily determined with respect to which of the first display unit 16a and the second display unit 16b the touch operation is carried out.

The present invention is not limited to the embodiments described above. Various improvements and design modifications can be made without departing from the scope of the present invention.

For example, in the embodiment described above, digital time display image is displayed on the second display unit 16b as a time indication. However, the present invention is not limited thereto. An analog time display image which indicates time by an hour hand, a minute hand and a second hand may be displayed, for example. In this case, if it is determined that touch operation on the operation unit 19 is carried out with respect to the time display image of the second display unit 16b (for example, an area of the "hour hand"), the second display control unit 18 switches the "hour hand" indication displayed on the second display unit 16b to a blink indication (displayed content modification image). If the "hour hand" in the blink indication on the screen is touched by a finger and the finger is slid, the displayed time can be changed. The first display unit 16a and the second display unit 16b can display any information, which is not limited to the time display image and the map image.

In the embodiment described above, a multi-touch gesture is described as a touch gesture specific to the first display unit 16a and a touch and hold gesture at one position is described as a touch gesture specific to the second display unit 16b. However, touch gestures are not limited to those described above. Any touch gesture is applicable if it is possible to determine the touch gesture is specific to one of the display units.

In the embodiment described above, the touch gesture pattern data 15b includes touch gesture patterns being specific to and associated with one of the first display unit 16a and the second display unit 16b, respectively. The touch gesture pattern data 15b may include touch gesture patterns each being specific to and associated with one of the display areas. In this case, the determination unit 20 determines with respect to which of the first display unit 16a and the second display unit 16b the touch operation is carried out and with respect to which display area of the determined display unit the touch operation is carried out, based on at least one of displaying feature on the first display unit 16a and the second display unit 16b and feature of the touch operation when touch operation is carried out on the operation unit 19.

In the embodiment described above, even when the touch operation is not carried out with respect to the overlapped area where the display areas of the first display unit 16a and the second display unit 16b are overlapped with each other, the determination unit 20 may be configured to determine that the touch operation is carried out with respect to the display unit associated with the touch gesture pattern.

In the embodiment described above, a mode in which the first display unit 16a is operated and a mode in which the second display unit 16b is operated may be switched by a switch, and the determination unit 20 may determine that the touch operation is carried out with respect to the display unit associated with the mode designated by the switch.

The switch described above may designate with respect to which display unit the touch operation is carried out. Namely, a mode in which the touch operation is carried out with respect to the first display unit 16a and a mode in which the touch operation is carried out with respect to the second display unit 16b may be switched and the determination unit 20 may determine that the touch operation is carried out with respect to the display unit associated with the mode which is designated by the switch.

The switch may be provided separately on the operation unit 19 as a manual switch. A partial area of the touch panel 30 may be used as an area which functions as the switch.

In the embodiment described above, the display unit 16 is composed of two display units that are the first display unit 16a and the second display unit 16b, but the present invention is not limited thereto. The display unit 16 is applicable as long as the display unit 16 is composed of a plurality of display units laminated on one another. In this case, the display unit(s) other than at least the lowermost layer is composed of a PN (Polymer Network) liquid crystal panel which can partially or entirely transmit light.

In the embodiment described above, the first display unit 16a displays the map image M but the present invention is not limited thereto. The first display unit 16a may display a user's desired still images or moving images, for example. The second display unit 16b displays the time display image but the present invention is not limited thereto. The second display unit 16b may display images showing a speed (running pace) and a running distance, for example, if the wearable terminal device has, for example, a GPS function and an accelerometer.

In the embodiment described above, the map image M is displayed on the first display unit 16a based on the map database 15a stored in the storage unit 15 but the present invention is not limited thereto. The wearable terminal device may obtain map data provided on the internet through a communication unit and display a map image based on this map data.

In the embodiment described above, the present invention is configured such that a function of a controller is realized by the determination unit driven under the control of the main CPU 11, but the present invention is not limited thereto. The main CPU 11 may realize the function of the controller by executing a predetermined program(s)

Namely, a program(s) including a determination process routine is stored in a program memory (not shown) for storing a program(s). The determination process routine may be configured to cause the main CPU 11 to function as a unit which determines with respect to which of the first display unit 16a and the second display unit 16b the touch operation is carried out and carries out a process corresponding to the touch operation with respect to the determined display unit.

In the embodiment described above, a display device of the present invention is described by citing the wearable terminal device as an example but the present invention is not limited thereto. The present invention is applicable to a terminal device such as a portable phone, a smartphone and a PDA.

Embodiments of the present invention have been described, but the scope of the present invention is not limited to the embodiments described above, but includes the scope of the invention described in claims and equivalents thereof.

The invention claimed is:

1. A display device, comprising:
a display including a first display panel and a second display panel laminated on each other, the second display panel consuming less power than the first display panel;
a touch panel which is provided on a screen of the display and accepts a touch operation; and
a controller,
wherein:
the touch panel is provided on top of the second display panel, and the second display panel is laminated on top of the first display panel,
relative positions of the touch panel, the second display panel, and the first display panel in relation to each other are fixed,
the controller determines with respect to which display panel of the first and second display panels the touch operation is carried out, and carries out a process corresponding to an operation content of the touch operation on the determined display panel, and
in response to a determination that the touch operation is carried out in a state in which both the first and second display panels are turned off, the controller turns on only the second display panel.

2. The display device according to claim 1, wherein the controller determines with respect to which display panel of the first and second display panels the touch operation is carried out based on a displaying feature of the first and second display panels at an operation position where the touch operation is carried out.

3. The display device according to claim 2, wherein the controller detects one or more display areas where information is being displayed on the first and second display panels and the operation position where the touch operation is carried out, and determines with respect to which display panel of the first and second display panels the touch operation is carried out based on the detected display area and the detected operation position.

4. The display device according to claim 3, wherein when the controller detects the operation position on the detected display area, the controller determines that the touch operation is carried out with respect to a display panel of the first and second display panels which displays the information in the detected display area.

5. The display device according to claim 4, further comprising a memory which stores a touch gesture pattern specific to and associated with each of the first and second display panels or each display area,
wherein when the touch operation is carried out on an overlapped area where detected display areas overlap each other, the controller determines that the touch operation is carried out with respect to a display panel or display area associated with the touch gesture pattern of the touch operation.

6. The display device according to claim 1, wherein the controller determines with respect to which display panel of the first and second display panels the touch operation is carried out based on a feature of the touch operation at an operation position where the touch operation is carried out.

7. The display device according to claim 1, wherein the first and second display panels include one or more liquid crystal displays which can each partially or entirely transmit light, except for at least a lowermost display panel.

8. The display device according to claim 1, further comprising a manual switch to designate with respect to which display panel of the first and second display panels the touch operation is carried out,
wherein the controller determines a state of the switch and carries out the process corresponding to the operation content of the touch operation on the designated display panel.

9. The display device according to claim 1, wherein:
the first display panel is disposed at a lower side of the display and the second display panel is disposed at an upper side of the display,
a backlight is provided on a lower side of the first display panel, and
the touch panel is provided on an upper side of the second display panel.

10. The display device according to claim 9, wherein:
the controller detects (i) a first display area and a second display area where information are respectively being displayed on the first display panel and the second display panel and (ii) an operation position where the touch operation is carried out, and
when the touch operation is carried out on an overlapped area where the first and second display areas overlap each other and a feature of the touch operation is a touch and hold gesture which lasts at least a predetermined duration of time, the controller determines that the touch operation is carried out with respect to the second display panel.

11. The display device according to claim 9, wherein:
the controller detects (i) a first display area and a second display area where information are respectively being displayed on the first display panel and the second display panel and (ii) an operation position where the touch operation is carried out, and
when the touch operation is carried out on an overlapped area where the first and second display areas overlap each other and a feature of the touch operation is a touch and hold gesture which lasts shorter than a predetermined duration of time, the controller determines that the touch operation is carried out with respect to the first display panel.

12. The display device according to claim 9, wherein:
the controller detects (i) a first display area and a second display area where information are respectively being displayed on the first display panel and the second display panel and (ii) an operation position where the touch operation is carried out, and
when the touch operation is carried out on an overlapped area where the first and second display areas overlap each other and a feature of the touch operation is a multi-touch gesture with which the touch operation is carried out at a plurality of points, the controller determines that the touch operation is carried out with respect to the first display panel.

13. The display device according to claim 9, wherein:
the controller includes a main controller and a sub controller,
the main controller carries out the process corresponding to the operation content of the touch operation with respect to the first display panel, and
the sub controller carries out the process corresponding to the operation content of the touch operation with respect to the second display panel.

14. The display device according to claim 9, wherein:
the controller includes a main controller and a sub controller, the main controller carries out the process relating to a command for display control on the first display panel, the sub controller carries out the process relating to a command for display control on the second display panel, and the main controller and the sub controller carry out the process relating to the command for display control on the first display panel and the process relating to the command for display control on the second display panel, respectively, in a mutually exclusive manner.

15. The display device according to claim 9, wherein the controller determines with respect to which display panel of the first and second display panels the touch operation is carried out based on, as a displaying feature of the first and second display panels, which display panel of the first display panel and the second display panel displays an image.

16. The display device according to claim 9, wherein the first display panel and the second display panel operate in a mutually exclusive manner.

17. The display device according to claim 1, wherein the controller:

detects an operation position on which the touch operation is carried out;

determines that the touch operation is carried out with respect to the first display panel, when the detected operation position corresponds to a first display area of the display where display is being performed by the first display panel;

determines that the touch operation is carried out with respect to the second display panel, when the detected operation position corresponds to a second display area on the display where display is being performed by the second display panel, the second display area being a mutually exclusive area from the first display area for the purpose of detecting the operation position; and in response to the determination that the touch operation is carried out in the state in which both the first and second display panels are turned off, turns on only the second display panel regardless of the operation position on which the touch operation is carried out.

18. A method for controlling a display device including (i) a display including a first display panel and a second display panel laminated on each other, the second display panel consuming less power than the first display panel, and (ii) a touch panel provided on a screen of the display, wherein the touch panel is provided on top of the second display panel, and the second display panel is laminated on top of the first display panel, and relative positions of the touch panel, the second display panel, and the first display panel in relation to each other are fixed, the method comprising:

determining with respect to which display panel of the first and second display panels a touch operation on the touch panel is carried out;

carrying out a process corresponding to an operation content of the touch operation on the determined display panel; and turning on only the second display panel, in response to a determination that the touch operation is carried out in a state in which both the first and second display panels are turned off.

19. A non-transitory storage medium having stored thereon a program which is executable by a computer of a display device including (i) a display including a first display panel and a second display panel laminated on each other, the second display panel consuming less power than the first display panel, and (ii) a touch panel which is provided on a screen of the display and accepts a touch operation, wherein the touch panel is provided on top of the second display panel, and the second display panel is laminated on top of the first display panel, and relative positions of the touch panel, the second display panel, and the first display panel in relation to each other are fixed, and wherein the program, when executed, causes the computer to perform operations comprising:

determining with respect to which display panel of the first and second display panels the touch operation is carried out;

carrying out a process corresponding to an operation content of the touch operation on the determined display panel; and turning on only the second display panel, in response to a determination that the touch operation is carried out in a state in which both the first and second display panels are turned off.

* * * * *